(12) United States Patent
Zhong et al.

(10) Patent No.: US 10,340,846 B2
(45) Date of Patent: Jul. 2, 2019

(54) PHOTOVOLTAIC JUNCTION BOX

(71) Applicant: Tyco Electronics (Shanghai) Co. Ltd., Shanghai (CN)

(72) Inventors: Yuan Zhong, Shanghai (CN); Xiang Xu, Shanghai (CN); Wenbo Lv, Shanghai (CN); Cui Li, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 15/245,323

(22) Filed: Aug. 24, 2016

(65) Prior Publication Data

US 2017/0063299 A1 Mar. 2, 2017

(30) Foreign Application Priority Data

Aug. 26, 2015 (CN) ...................... 2015 2 0650408 U

(51) Int. Cl.
*H02S 40/34* (2014.01)
*H02G 3/14* (2006.01)

(52) U.S. Cl.
CPC ............ *H02S 40/345* (2014.12); *H02G 3/14* (2013.01); *H02S 40/34* (2014.12)

(58) Field of Classification Search
CPC .................................................. H02S 40/345
See application file for complete search history.

(56) References Cited

U.S. PATENT DOCUMENTS

| | | | | |
|---|---|---|---|---|
| 7,824,189 B1* | 11/2010 | Lauermann | ............. | H02S 40/34 136/246 |
| 2010/0018572 A1* | 1/2010 | Grimberg | ............... | H02G 3/086 136/252 |
| 2010/0105245 A1* | 4/2010 | Good | ..................... | H02S 40/34 439/571 |
| 2010/0263714 A1* | 10/2010 | Lauermann | ............. | H02S 40/34 136/251 |
| 2012/0048615 A1* | 3/2012 | Masumoto | ............. | H02S 40/34 174/547 |
| 2013/0193568 A1* | 8/2013 | Yamazaki | ............... | H01L 23/32 257/698 |
| 2014/0361671 A1* | 12/2014 | Degner | ..................... | G06F 1/20 312/223.2 |

* cited by examiner

*Primary Examiner* — Hung V Ngo
(74) *Attorney, Agent, or Firm* — Barley Snyder

(57) ABSTRACT

A photovoltaic junction box is disclosed. The photovoltaic junction box has a base having a receiving chamber, a cover mounted on the base closing the receiving chamber, and a plurality of ventilation passageways. The plurality of ventilation passageways are disposed between a peripheral edge of the cover and a peripheral edge of the receiving chamber, and communicate between the receiving chamber and an area external of the photovoltaic junction box.

18 Claims, 5 Drawing Sheets

PHOTOVOLTAIC JUNCTION BOX

CROSS-REFERENCE TO RELATED APPLICATION

This application claims the benefit of the filing date under 35 U.S.C. § 119(a)-(d) of Chinese Patent Application No. 201520650408.3 filed on Aug. 26, 2015.

FIELD OF THE INVENTION

The present invention relates to a photovoltaic junction box, and more particularly, to a photovoltaic junction box capable of being mounted on a solar panel.

BACKGROUND

Solar panels are generally adapted to collect solar energy and transform the collected solar energy to electrical energy. A plurality of solar panels is often connected together by photovoltaic junction boxes to combine the electrical current output of the solar panels.

Known photovoltaic junction boxes have a base and a cover mounted on the base. Electronic elements, such as conduction terminals and diodes, are positioned in a receiving chamber of the base. In the prior art, the base and the cover are engaged with each other hermetically without any gap therebetween, such that the internal space of the photovoltaic junction box is sealed from the external space. However, due to the seal between the base and the cover, heat produced by the diodes during operation is contained within the photovoltaic junction box and is difficult to discharge to the external atmosphere. As the temperature inside the photovoltaic junction box increases, the service life of the diodes and the photoelectric conversion efficiency of the photovoltaic junction box are adversely affected.

SUMMARY

An object of the invention, among others, is to provide a photovoltaic junction box which rapidly dissipates internal heat to the external atmosphere. The disclosed photovoltaic junction box comprises a base having a receiving chamber, a cover mounted on the base closing the receiving chamber, and a plurality of ventilation passageways. The plurality of ventilation passageways are disposed between a peripheral edge of the cover and a peripheral edge of the receiving chamber, and communicate between the receiving chamber and an area external of the photovoltaic junction box.

BRIEF DESCRIPTION OF THE DRAWINGS

The invention will now be described by way of example with reference to the accompanying figures, of which.

DETAILED DESCRIPTION OF THE EMBODIMENT(S)

The invention is explained in greater detail below with reference to embodiments of a photovoltaic junction box. This invention may, however, be embodied in many different forms and should not be construed as limited to the embodiments set forth herein; rather, these embodiments are provided so that this disclosure will be thorough and complete and still fully convey the scope of the invention to those skilled in the art.

Figure 1:
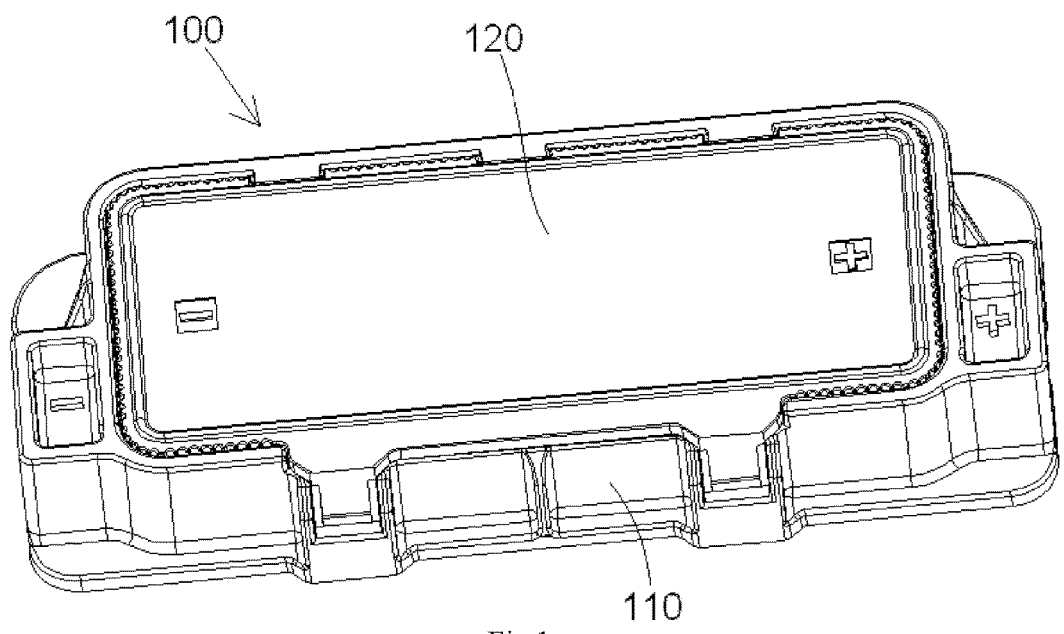
FIG. 1 is a perspective view of a photovoltaic junction box according to the invention.
Figure 2:
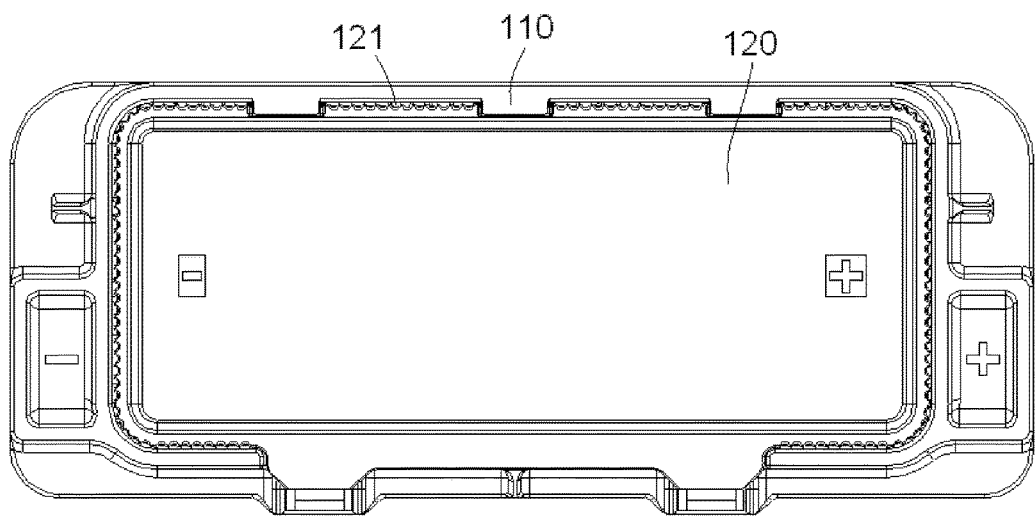
FIG. 2 is a top plan view of the photovoltaic junction box of FIG. 1.
Figure 3:
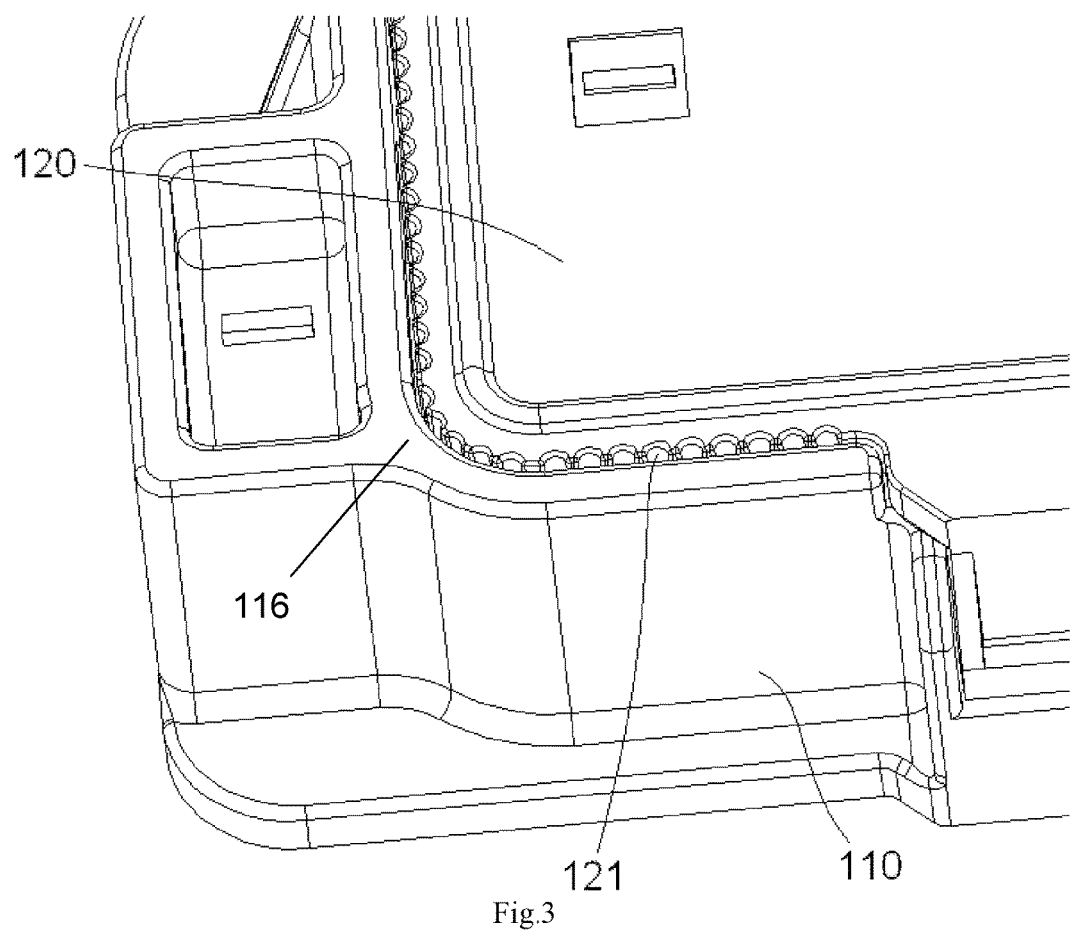
FIG. 3 is an enlarged perspective view of the photovoltaic junction box of FIG. 1.

A photovoltaic junction box 100 according to the invention is shown generally in FIGS. 1-3. The photovoltaic junction box 100 has a base 110 and a cover 120. The major components of the invention will now be described in greater detail.

Figure 4:
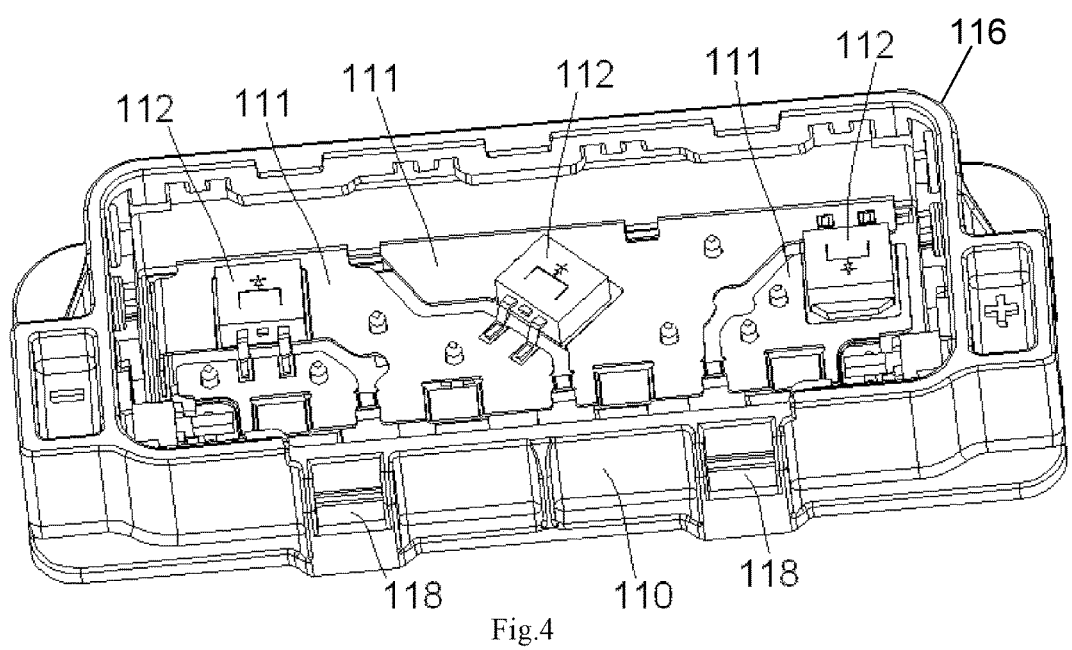
FIG. 4 is a perspective view of a base of the photovoltaic junction box of FIG. 1.

The base 110 is shown in FIGS. 1-4 and 6. As shown in FIG. 4, the base 110 has a receiving chamber 116 receiving electronic elements 111, 112. The electronic elements 111, 112, in the shown embodiment, are conduction terminals 111 and diodes 112 connecting adjacent conduction terminals 111. The diodes 112 may be soldered on the conduction terminals 111 by surface-mount technology ("SMT"), such that the diodes 112 are directly mounted on the surface of the conduction terminals 111. In the embodiment shown in FIG. 6, the conduction terminals 111 and diodes 112 are sealed or potted within the base 110 by a sealant 114 poured into the receiving chamber 116. As shown in FIG. 4, the base 110 also has a plurality of slots 118 disposed on an outer side of the base 110.

Figure 5:
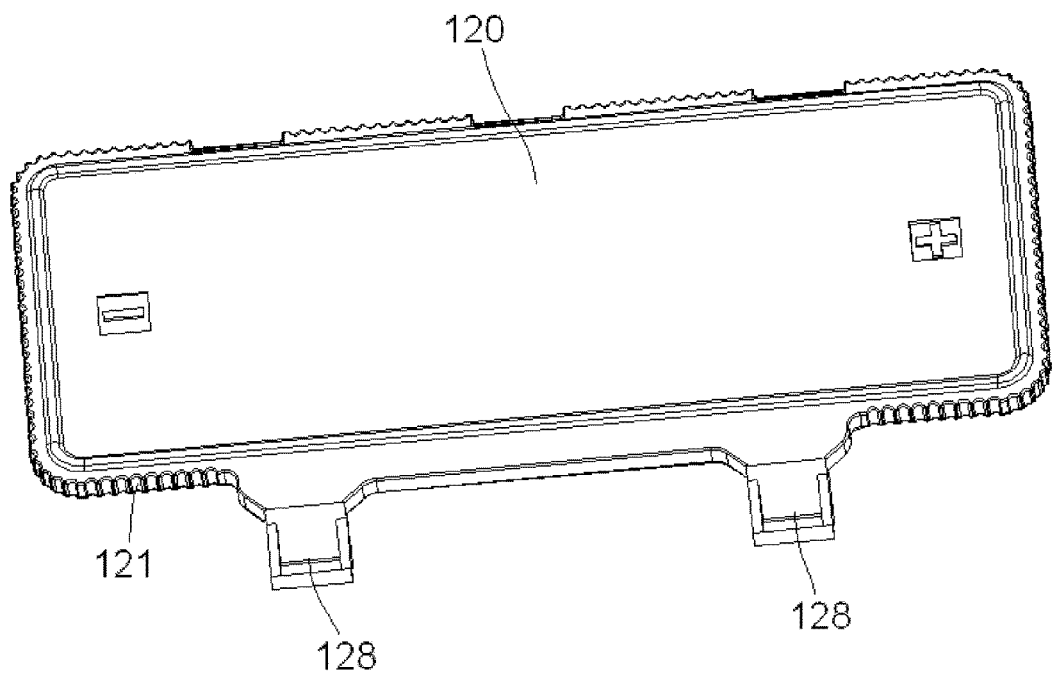
FIG. 5 is a perspective view of a cover of the photovoltaic junction box of FIG. 1.

The cover 120 is shown in FIGS. 1, 2, 3, 5, and 6. As shown in FIG. 5, the cover 120 has a plurality of ventilation passageways 121 formed on and extending through a peripheral edge of the cover 120. In the shown embodiment, the ventilation passageways 121 are formed as semicircle-shaped holes. The ventilation passageways 121 may alternatively be formed on a peripheral edge of the receiving chamber 116 of the base 110, or on both the peripheral edge of the cover 120 and the peripheral edge of the receiving chamber 116. The cover 120 also has a plurality of resilient protrusions 128, as shown in FIG. 5. In the shown embodiment, the resilient protrusions 128 are formed on a side of the cover 120 and extend perpendicular to the cover 120.

As shown in FIGS. 1-3 and 6, the cover 120 is mounted to the base 110. In an embodiment, the cover 120 is mounted to the base 110 by engaging the plurality of resilient protrusions 128 with the plurality of slots 118, for example, by snap-fitting. The cover 120 thus closes the receiving chamber 116.

The use of the photovoltaic junction box 100 will now be described in greater detail.

As shown in FIGS. 1-3, when the cover 120 is mounted to the base 110, the plurality of ventilation passageways 121 are disposed between a peripheral edge of the cover 120 and a peripheral edge of the receiving chamber 116. Due to the plurality of ventilation passageways 121, the receiving chamber 116 communicates with an area external of the photovoltaic junction box 100; external air may thus enter into the photovoltaic junction box 100 via the ventilation passageways 121, and hot air inside the photovoltaic junction box 100 may be discharged to the outside rapidly via the ventilation passageways 121.

Figure 6:
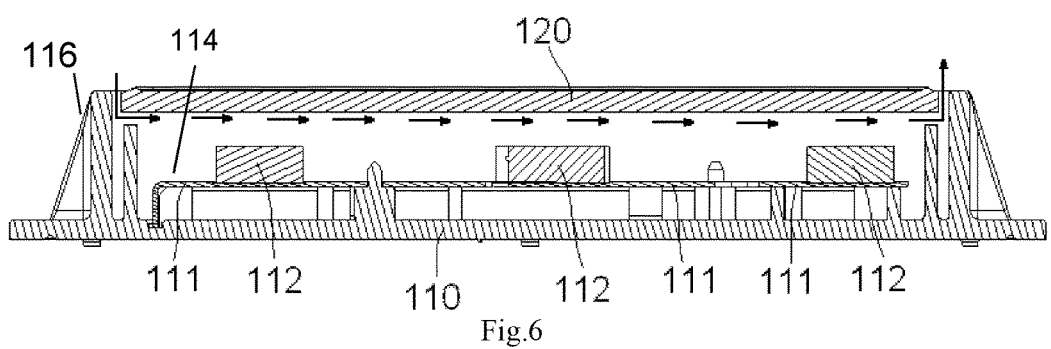
FIG. 6 is a sectional view of the photovoltaic junction box of FIG. 1.

As shown in FIG. 6, the sealant 114 is separated from the cover 120 by a predetermined distance so as to allow the air to flow in the receiving chamber 116, and as depicted by the arrows, the air may be circulated in a manner of convection within the photovoltaic junction box 100 and through the ventilation passageways 121. The heat generated by the diodes 112 in operation is quickly brought out of the photovoltaic junction box 100, thereby reducing the temperature inside the photovoltaic junction box 100.

Advantageously, according to the photovoltaic junction box 100 of the present invention, generated heat can be rapidly dissipated via the ventilation passageways 121 to reduce the temperature inside the photovoltaic junction box 100, prolonging the service life of the diodes 112 and improving the photoelectric conversion efficiency of the photovoltaic junction box 100.

What is claimed is:

1. A photovoltaic junction box, comprising:
a base having a receiving chamber with a peripheral edge surrounding the receiving chamber and a plurality of slots disposed on an outer side of the receiving chamber;
a cover fully mounted on the base closing the receiving chamber, the cover having a plurality of resilient protrusions formed on a side of the cover and extending from a peripheral edge of the cover, a portion of the cover disposed between the plurality of resilient protrusions extends beyond the peripheral edge of the cover in a plane of the cover and overlays the peripheral edge of the base when the cover is mounted on the base; and
a plurality of ventilation passageways disposed between the peripheral edge of the cover and the peripheral edge of the receiving chamber, the plurality of ventilation passageways integrally formed in at least one of the peripheral edge of the cover and the peripheral edge of the receiving chamber and extending along an entirety of each of a pair of opposite sides of at least one of the peripheral edge of the cover and the peripheral edge of the receiving chamber, the plurality of ventilation passageways communicating between the receiving chamber and an area external of the photovoltaic junction box when the cover is fully mounted on the base.

2. The photovoltaic junction box of claim 1, wherein the plurality of ventilation passageways are formed on the peripheral edge of the cover.

3. The photovoltaic junction box of claim 1, wherein the plurality of ventilation passageways are formed on the peripheral edge of the receiving chamber.

4. The photovoltaic junction box of claim 1, wherein the plurality of ventilation passageways are formed on both the peripheral edge of the cover and the peripheral edge of the receiving chamber.

5. The photovoltaic junction box of claim 1, further comprising a plurality of electronic elements disposed within the receiving chamber.

6. The photovoltaic junction box of claim 5, wherein the electronic elements comprise a plurality of conduction terminals and a plurality of diodes.

7. The photovoltaic junction box of claim 6, wherein each diode connects adjacent conduction terminals.

8. The photovoltaic junction box of claim 7, wherein each diode is soldered on the adjacent conduction terminals.

9. The photovoltaic junction box of claim 8, wherein each diode is directly mounted on surfaces of the adjacent conduction terminals.

10. The photovoltaic junction box of claim 5, wherein the electronic elements are sealed by a sealant poured into the receiving chamber.

11. The photovoltaic junction box of claim 10, wherein the sealant is separated from the cover by a predetermined distance.

12. The photovoltaic junction box of claim 1, wherein the cover is snap-fit to the base.

13. The photovoltaic junction box of claim 12, wherein the plurality of resilient protrusions engage the plurality of slots.

14. The photovoltaic junction box of claim 1, wherein the plurality of ventilation passageways communicate between the receiving chamber and the area external of the photovoltaic junction box in all positions of the cover mounted on the base.

15. The photovoltaic junction box of claim 1, wherein each of the ventilation passageways is a semicircle-shaped hole formed in at least one of the peripheral edge of the cover and the peripheral edge of the receiving chamber.

16. The photovoltaic junction box of claim 1, wherein the plurality of ventilation passageways extend over half of at least one of the peripheral edge of the cover and the peripheral edge of the receiving chamber.

17. The photovoltaic junction box of claim 1, wherein the plurality of ventilation passageways are disposed on the side of the cover having the plurality of resilient protrusions and extend up to a position adjacent each of the plurality of resilient protrusions.

18. The photovoltaic junction box of claim 17, wherein the plurality of ventilation passageways are not disposed on the portion of the cover disposed between the plurality of resilient protrusions.

\* \* \* \* \*